US006880961B2

(12) United States Patent
Lin

(10) Patent No.: US 6,880,961 B2
(45) Date of Patent: Apr. 19, 2005

(54) COLOR SEPARATION DISC ASSEMBLY COMBINABLE WITH LIGHTNING BALL AND ARTICLE FORMED OF OPTICAL FIBERS

(76) Inventor: Cheng-Fu Lin, No. 97, Herng Shi Rd., San Shia Chen, Taipei Hsien (TW)

( * ) Notice: Subject to any disclaimer, the term of this patent is extended or adjusted under 35 U.S.C. 154(b) by 28 days.

(21) Appl. No.: 10/436,095

(22) Filed: May 13, 2003

(65) Prior Publication Data

US 2004/0228140 A1 Nov. 18, 2004

(51) Int. Cl.[7] .............................. F21V 7/04; G02B 6/04
(52) U.S. Cl. ....................... 362/554; 362/565; 362/806; 362/362; 362/265; 362/811; 362/228
(58) Field of Search ......................... 315/185 S, 200 A; 362/554, 583, 565, 806, 362, 265, 811, 228

(56) References Cited

U.S. PATENT DOCUMENTS

| 3,662,381 | A | * | 5/1972 | Steffens | ........................ | 40/444 |
| 5,558,421 | A | * | 9/1996 | Guastella | ..................... | 362/565 |
| 6,710,545 | B1 | * | 3/2004 | Yamaguchi et al. | .......... | 315/82 |

* cited by examiner

*Primary Examiner*—Stephen Husar
*Assistant Examiner*—Sharon Payne
(74) *Attorney, Agent, or Firm*—Bacon & Thomas

(57) ABSTRACT

A color separation disc assembly combinable with an article formed of optical fibers. The assembly has a color separation disc that is able to rotate along with a shaft of a motor for generating different colors on ends of optical fibers by separating light emitted from a light source therethrough. A lightning ball is adjacent to the article and electrically connected to a high voltage generation circuit for generating lightning therein, enabling the article to have a colorful appearance within a dazzling environment.

10 Claims, 3 Drawing Sheets

COLOR SEPARATION DISC ASSEMBLY COMBINABLE WITH LIGHTNING BALL AND ARTICLE FORMED OF OPTICAL FIBERS

FIELD OF THE INVENTION

The present invention relates to color separation disc assemblies and more particularly to an improved color separation disc assembly adapted to combine with both a lightning ball and an article formed of optical fibers.

BACKGROUND OF THE INVENTION

Due to the continued progress of science, lots of gift manufacturers are available to utilize modern technologies to manufacture a variety of articles as gifts having unique appearance and dazzling features attracting the customers to purchase. It is known that optical fibers are capable of transmitting light. As such, for example, some articles shaped as flowers, human beings, animals, or monsters are thus made of optical fibers and able to emit light. In a manufacturing process, one ends of a plurality of optical fibers are extended to different positions of the article. For example, ends of the optical fibers are extended to the extended wings of an article of angel or dragon. Opposite ends of the optical fibers are formed as a bundle extended to a bottom of the article. As such, in response to a light cast on the opposite ends of the optical fibers from a light source at the bottom of the article, light is then transmitted through the optical fibers to the ends of the wings to generate a dazzling effect on the article.

In addition, a type of lightning ball is available on the market. The lightning ball comprises a glass ball and a base having a high voltage generation circuit. A high voltage cord in the high voltage generation circuit is extended to a center of the glass ball. In response to a conduction of the high voltage cord, a generated high voltage by the high voltage cord will ionize air in the glass ball. As a result, a phenomenon similar to lightning is generated within the glass ball. Hence, the lightning balls are becoming novel gifts for being visually attractive and having an educational purpose.

People are more concerned about quality and design of a product as time evolves. Particularly, more people like products being artistic and visually attractive. Unfortunately, there are still some available articles being poor in quality, unsightly, monotonous in design, and inartistic. It is obvious that a person will buy an article being high in quality and visually attractive as compared with the other one if they are sold in the same price. Moreover, gift markets are very competitive nowadays, gift or artistic article manufacturers dedicate to develop products having a unique and dazzling appearance to visually attract the purchaser. Otherwise, the manufacturers will be eliminated from the gift markets due to inability of keeping up with the trend.

Fortunately, the present inventor recognizes that a product combined with a lightning ball and an article formed of optical fibers will lead in the near future. Hence, a need for improvement of the above exists.

SUMMARY OF THE INVENTION

A primary object of the present invention is to provide a color separation disc assembly combinable with both a lightning ball and an article formed of optical fibers. By utilizing this, the above drawback of being monotonous in design as experienced in the prior art of gifts can be overcome.

In one aspect of the present invention, the color separation disc assembly on a base thereof comprises a motor, a color separation disc, a light source, a rectification circuit, and a high voltage generation circuit. A shaft of the motor and thus the color separation disc will rotate when an alternating current (ac) is fed to a power supply. Light emitted from the light source will generate different colors on ends of optical fibers by passing through the rotating color separation disc. Also, the rectification circuit is adapted to convert the fed ac into a direct current (dc) which is in turn used as a power source of the high voltage generation circuit.

In another aspect of the present invention the color separation disc assembly of the invention is adapted to combine an article formed of optical fibers for generating a dazzling effect on the article. Moreover, there is further provided a glass ball adjacent to the article electrically connected to a high voltage generation circuit for generating lightning therein, enabling the article to have a colorful appearance within a dazzling environment. As an end, a value of the color separation disc assembly of the invention is greatly increased.

The above and other objects, features and advantages of the present invention will become apparent from the following detailed description taken with the accompanying drawings.

DETAILED DESCRIPTION OF THE PREFERRED EMBODIMENTS

Figure 1:
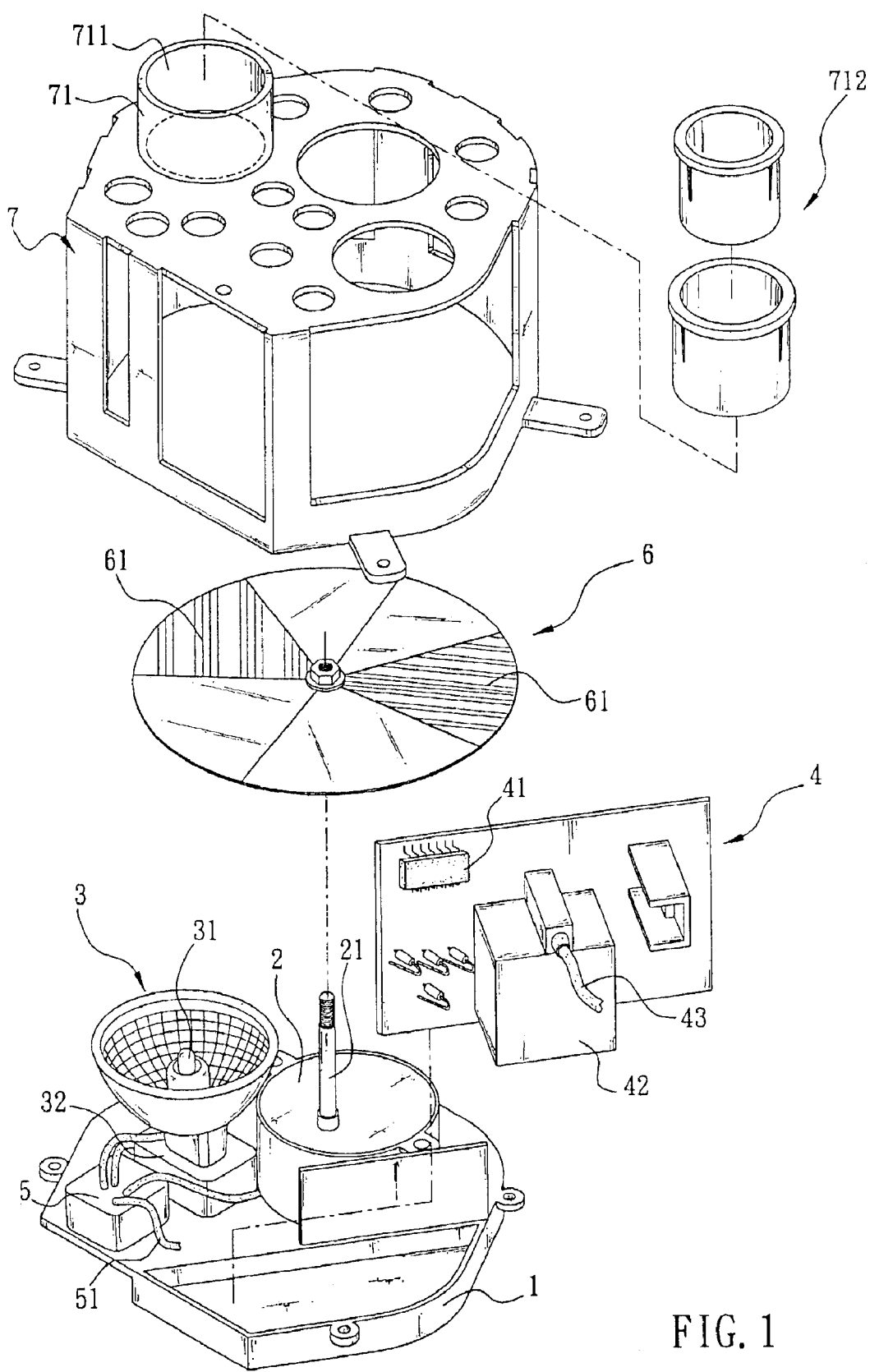
FIG. 1 is an exploded view of a color separation disc assembly according to the invention.

Referring to FIG. 1, there is shown a color separation disc assembly combinable with both a lightning ball and an article formed of optical fibers in accordance with the invention. On a base 1 of the color separation disc assembly, there are provided a motor 2, a light source 3, a circuit board 4, and a power supply 5 comprising a plurality of wires 51 connected to the motor 2, the light source 3, and the circuit board 4 respectively. A shaft 21 is extended from the motor 2 distal from the base 1. A color separation disc 6 is connected to the other end of the shaft 21 distal from the motor 2. The light source 3 is adjacent the motor 2 so that the light source 3 is able to emit light toward the color separation disc 6. The circuit board 4 comprises a rectification circuit 41 and a high voltage generation circuit 42 having a high voltage cord 43 extended therefrom.

Referring to FIG. 1 again, the shaft 21 and thus the color separation disc 6 will rotate when an alternating current (ac) is fed to the power supply 5. Next, light emitted from the light source 3 will generate different colors by passing through the rotating color separation disc 6. The rectification circuit 41 is adapted to convert the fed ac into a direct current (dc) which is in turn used as a power source of the high voltage generation circuit 42. Note that details about the rectification circuit 41 and rectification are well known. Thus a detailed description thereof is omitted herein for the sake of brevity.

It is found that an electromagnetic wave will be generated by both the rotating motor 2 and the enabled high voltage generation circuit 42. Such electromagnetic wave tends to interfere with the motor 2 or the high voltage generation circuit 42 for causing trouble to its normal operation. Hence, the circuit board 4 is formed upright on the base 1. Also, the rectification circuit 41 and the high voltage generation circuit 42 are opposite to the motor 2 and separated from the motor 2 by the circuit board 4. As such, an electric or magnetic field generated by the motor 2 will be greatly attenuated by the circuit board 4 and thus will not interfere with the high voltage generation circuit 42. Likewise, an electric or magnetic field generated by the high voltage generation circuit 42 will be greatly attenuated by the circuit board 4 and thus will not interfere with the motor 2.

Referring to FIG. 1, in the invention there is further provided a housing 7 covered on the base 1. The housing 7 comprises a cylindrical connector 71 on top adjacent the light source 3. The connector 71 has a channel 711 in communication with inside of the housing 7 so that light emitted from the light source 3 will go through the housing 7 by passing the channel 711.

Referring to FIG. 1 again, in the invention the light source 3 comprises an electric bulb 31 and a socket 32 with the electric bulb 31 mounted thereon. The electric bulb 31 will emit light when a power is fed to the light source 3.

Referring to FIG. 1 again, the color separation disc 6 is transparent and comprises a plurality of sectors 61 of different colors so that light emitted from the electric bulb 31 will generate different colors by passing through the rotating color separation disc 6.

Figure 2:
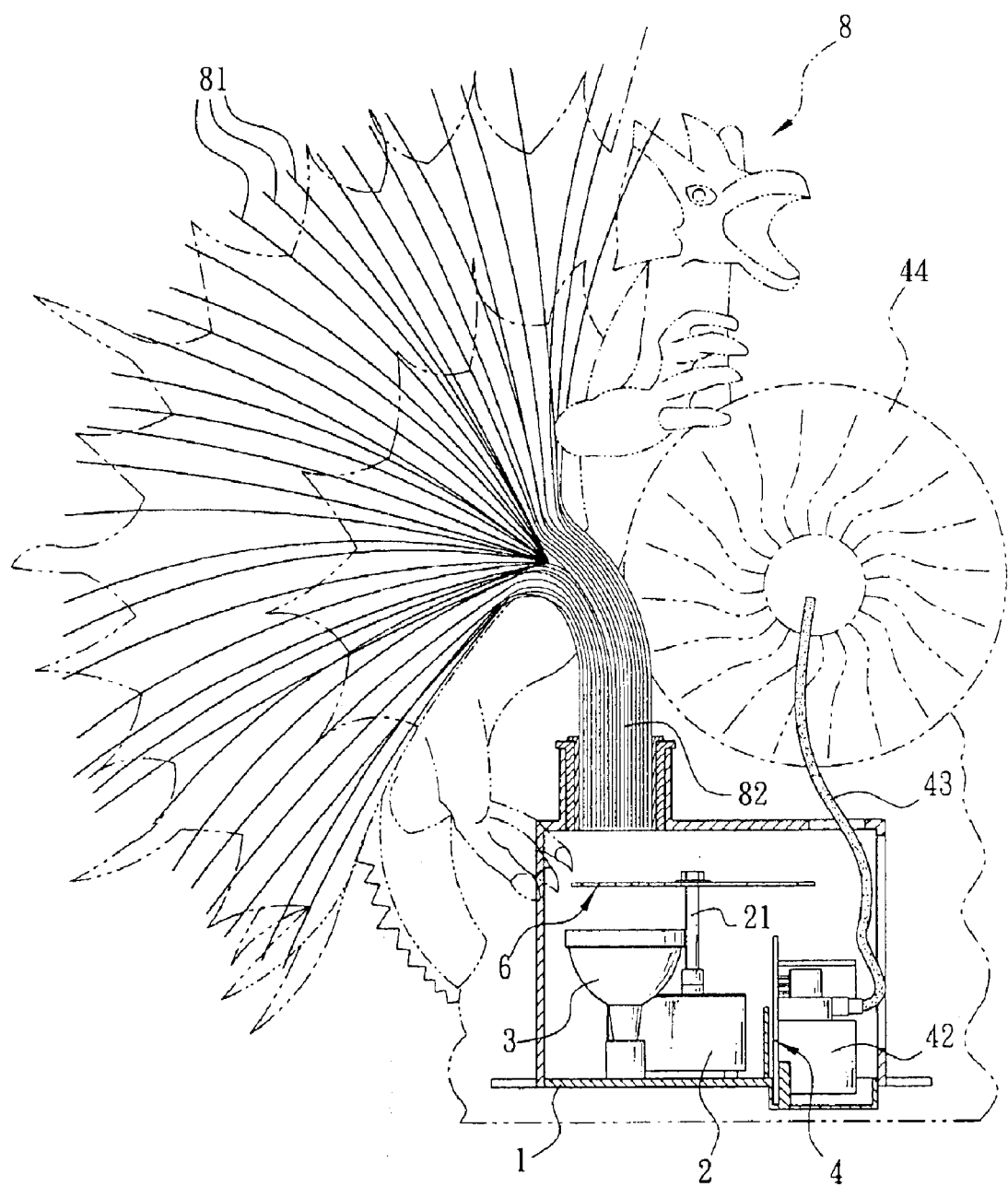
FIG. 2 is a sectional view of a first preferred embodiment of the color separation disc assembly combined with a lightning ball and an article formed of optical fibers according to the invention.

Referring to FIGS. 1 and 2, in a first preferred embodiment of the invention a glass ball is mounted on the housing 7. The high voltage cord 43 is extended inside the glass ball so as to form a lightning ball 44. It is known that an enabled high voltage generation circuit 42 will generate a high voltage. Thus, in response to a conduction of the high voltage cord 43 by the high voltage (i.e., electrically conducted), air in the lightning ball 44 will ionize. As a result, a phenomenon similar to lightning is generated within the lightning ball 44. In detail, static electricity of high voltage inside the lightning ball 44 will be conducted when a user's hand is put on the lightning ball 44. As a result, air of low pressure inside the lightning ball 44 will discharge to generate a plurality of flashes of light (i.e., a plurality of color lines). In view of the above, the lightning ball 44 incorporated by the invention will form a visually attractive device.

Figure 3:
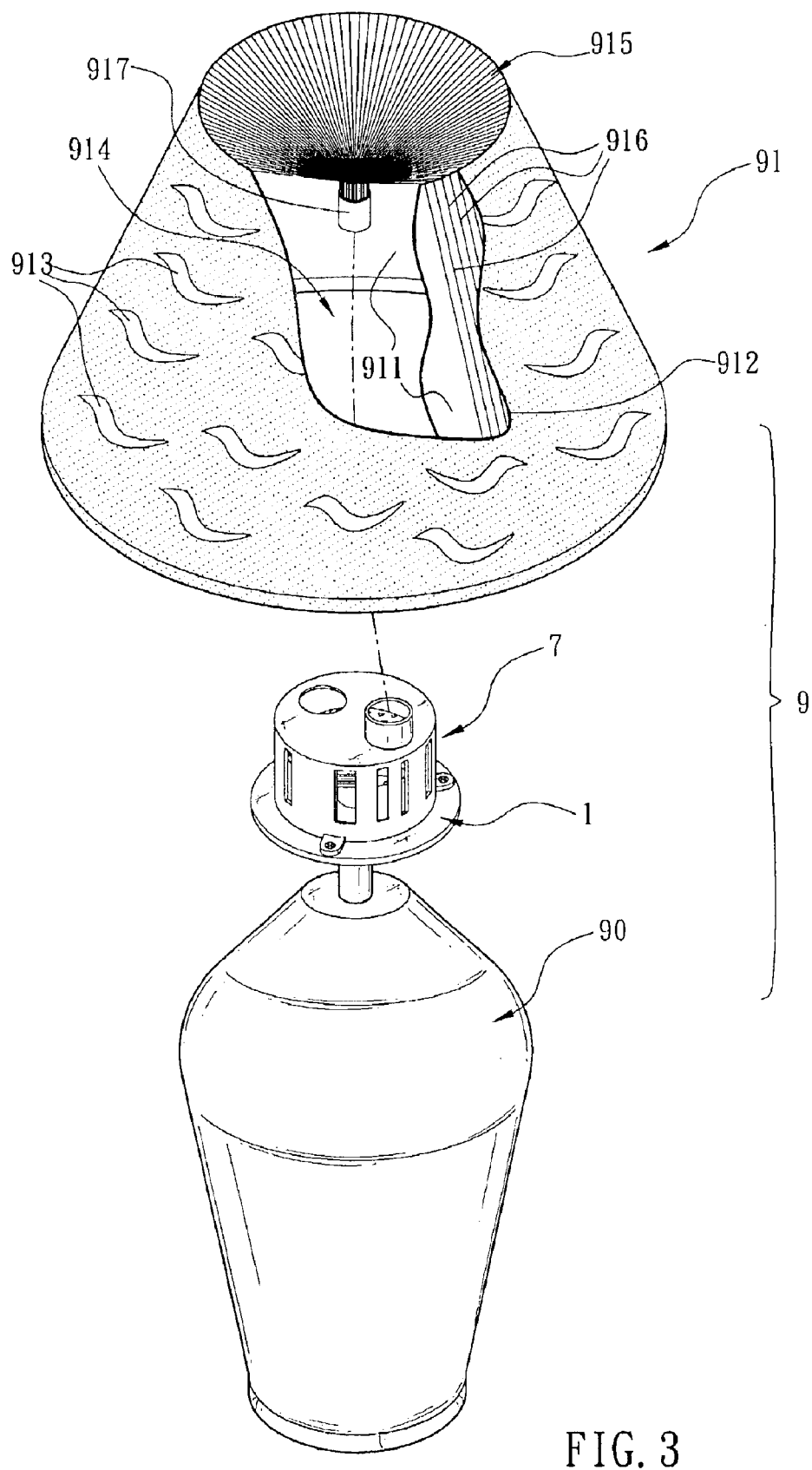
FIG. 3 is an exploded view of a second preferred embodiment of the color separation disc assembly mounted in a table lamp according to the invention.

Optical fibers are widely used in the art. For example, they are manufactured as artistic lamps, gifts, flowers, human beings, animals, monsters, etc. This is because optical fibers are capable of transmitting light. As such, light can be emitted from an article made of optical fibers by utilizing the above advantage of optical fibers. It is found hood of a typical table lamp 9 is poor in design and monotonous. This departs from the design trend of emphasizing personal fashion and quality. Hence, the invention mounts an article 8 or table lamp 9 on the housing 7 after having considered the above design concepts. Referring to FIGS. 2 and 3, light emitted from the light source 3 will generate different colors and create a dazzling effect on the article 8 or the table lamp 9 by passing through the rotating color separation disc 6. Following is a detailed description of two preferred embodiments combining the article 8 and the table lamp 9 with the invention respectively.

Referring to FIGS. 1 and 2, in the first preferred embodiment of the invention a predetermined component (e.g., wing) of an article (e.g., monster) 8 is formed of a transparent material (e.g., thin fabric or semi-transparent plastics). A plurality of optical fibers 81 are extended inside the article 8 in which on ends of the optical fibers 81 are extended to different positions of the wings and the other ends thereof are formed as a bundle 82. In a case that the article 8 is mounted on the housing 7 the bundle 82 is inserted in the channel 711 of the connector 71. Also, light emitted from the light source 3 will generate different colors by passing through the rotating color separation disc 6. The different colors then transmit to the article 8 via the bundle 82. As a result, a dazzling effect is generated on the article 8 (see FIG. 2).

Referring to FIGS. 1 and 3, in the second preferred embodiment of the invention the table lamp 9 comprises a stand 90 and a shade 91 including an inner layer 911 and an adhered outer layer 912 having the same shape as the inner layer 911. At least one transparent crescent pattern 913 is formed on the outer layer 912. A space 914 is formed inside the shade 91. Top and bottom of the shade 91 are formed as a first opening 915 and a second opening (not numbered). One ends of a plurality of optical fibers 916 are distributed between the inner layer 911 and the outer layer 912 and the other ends thereof are extended toward the first opening 915 and then are deflected toward the second opening to form a bundle receptacle 917 for covering the first opening 915. In a case that the shade 91 is mounted the bundle receptacle 917 is inserted in the channel 711 of the connector 71. Also, light emitted from the light source 3 will transmit from the other ends of the optical fibers 916 to one ends thereof. Hence, colorful light will be generated on the shade 91 as the emitted light passes the crescent patterns 913. As a result, a dazzling effect is generated on the table lamp 9 (see FIG. 3).

Note that a length of one line of the optical fibers 916 extended in the shade 91 (or the article 8) may be different from any of the other lines thereof. Also, an effective distance of light transmitted through one line of the optical fibers 916 may be different from any of the other lines. In a case that light emitted from the light source 3 will sequentially generate different colors by passing through the rotating color separation disc 6 in which a longer one of the optical fibers 916 will show more colorful light while to the contrary a shorter one of the optical fibers 916 will show less colorful light. For example, the color separation disc 6 consists of red, orange, yellow, green, and blue sectors. As such, red, orange, yellow, green, and blue lights are sequentially generated by the color separation disc 6 as light is emitted from the electric bulb 31. In a case that red, orange, yellow, green, and blue lights are transmitting through the optical fibers 916 previously transmitted orange, yellow, green lights and even red light still stay on a longer one of the optical fibers 916 when blue light starts to transmit through the longer one of the optical fibers 916. Likewise, only previously transmitted green light still stays on a shorter one of the optical fibers, 916 when blue light starts to transmit through the shorter one of the optical fibers 916. In other words, red, orange, and yellow lights had already transmitted through the shorter one of the optical fibers 916 into the air.

Referring to FIG. 3 again, as stated above a length of one line of the optical fibers 916 extended in the shade 91 (or the article 8) may be different from any of the other lines thereof. For example, the optical fibers 916 are arranged as one longer line and one shorter one side by side continuously around an inner surface of the shade 91 (or the article 8). Alternatively, the optical fibers 916 are arranged either from a longest one to a shortest one or from a shortest one to a longest one side by side continuously around an inner surface of the shade 91 (or the article 8). Still alternatively, the optical fibers 916 may be formed as a pattern so that colorful light will be generated on the shade 91 (or the article 8) as light is transmitted through the optical fibers 916.

Referring to FIGS. 1, 2 and 3 again, in the preferred embodiments the bundle 82 or the bundle receptacle 917 may have different diameters. As such, a bushing 712 is preferably placed in the channel 711 so that the bundle 82 or the bundle receptacle 917 can be fastened in the bushing 712 and thus in the connector 71.

While the invention has been described by means of specific embodiments, numerous modifications and variations could be made thereto by those skilled in the art without departing from the scope and spirit of the invention set forth in the claims.

What is claimed is:

1. A color separation disc assembly combinable with an article formed of optical fibers, the color separation disc assembly including a base, the color separation disc assembly on the base further comprising:
   a motor comprising a shaft extended at one side thereof distal from the base;
   a color separation disc fastened on the shaft, the color separation disc being parallel with the base;
   a light source disposed adjacent the motor so that the light source is adapted to emit light toward the color separation disc;
   a circuit board comprising a rectification circuit and a high voltage generation circuit having a high voltage cord extended therefrom;
   a lightning ball connected to the high voltage cord; and
   a power supply coupled to an external power source, the power supply comprising a plurality of wires connected to the motor, the light source, and the circuit board respectively.

2. The color separation disc assembly of claim 1, wherein the circuit board is formed upright on the base with the rectification circuit and the high voltage generation circuit opposite to the motor and separated from the motor by the circuit board.

3. The color separation disc assembly of claim 1, further comprising a housing mounted on the base, the housing comprising a cylindrical connector on a top thereof adjacent the light source, the connector having a channel in communication with inside of the housing.

4. The color separation disc assembly of claim 1, wherein the light source comprises an electric bulb and a socket with the electric bulb mounted thereon.

5. The color separation disc assembly of claim 1, wherein the color separation disc is transparent and comprises a plurality of sectors of different colors.

6. The color separation disc assembly of claim 3, wherein the lightning ball comprises a glass ball mounted on the housing with the high voltage cord extended inside the glass ball.

7. The color separation disc assembly of claim 3, wherein an article is mounted on the housing wherein, the article comprising a plurality of components formed of a transparent material, and further comprising a plurality of optical fibers extended inside the article, the optical fibers having on first ends thereof distributed in the components and second ends thereof formed as a bundle to allow mounting of the article on the housing by inserting the bundle in the channel of the connector.

8. The color separation disc assembly of claim 3, further comprising a table lamp mounted on the housing, the table lamp comprising:
   a shade including a first top opening, a second bottom opening, an inner layer, and an adhered outer layer having the same shape as the inner layer, the outer layer including at least one transparent pattern formed thereon;
   a space inside the shade, the space being in communication with both the first top opening and the second bottom opening; and
   a plurality of optical fibers having first ends thereof distributed between the inner and the outer layers and second ends thereof extended toward the first top opening and deflected toward the second bottom opening to form a bundle receptacle for covering the first top opening to allow mounting of the shade by inserting a bundle receptacle in the channel of the connector.

9. The color separation disc assembly of claim 8, wherein the optical fibers are arranged as one longer line and one shorter line side by side continuously around an inner surface of the shade.

10. The color separation disc assembly of claim 3, further comprising a bushing mounted in the channel.

\* \* \* \* \*